United States Patent [19]
Lin et al.

[11] Patent Number: 5,948,150
[45] Date of Patent: Sep. 7, 1999

[54] COMPOSITION TO IMPROVE COLORFASTNESS OF A PRINTED IMAGE

[75] Inventors: An-Chung Robert Lin, Cupertino; Howard S. Tom, San Jose, both of Calif.

[73] Assignee: Hewlett-Packard Company, Palo Alto, Calif.

[21] Appl. No.: 09/073,301

[22] Filed: May 5, 1998

[51] Int. Cl.⁶ .................................................. C09D 11/00
[52] U.S. Cl. ..................... 106/31.13; 106/31.27; 106/31.6; 106/31.58; 106/31.86; 106/31.43; 106/31.75
[58] Field of Search ............................ 106/31.13, 31.27, 106/31.6, 31.57, 31.85, 31.58, 31.86, 31.47, 31.77, 31.43, 31.75

[56] References Cited

U.S. PATENT DOCUMENTS

| | | | |
|---|---|---|---|
| 5,096,489 | 3/1992 | Laver | 106/31.47 |
| 5,180,624 | 1/1993 | Kojima et al. | 428/211 |
| 5,213,873 | 5/1993 | Yasuda et al. | 428/195 |
| 5,254,160 | 10/1993 | Beach et al. | . |
| 5,261,953 | 11/1993 | Vieria et al. | 106/31.43 |
| 5,266,383 | 11/1993 | Sakaki et al. | 428/195 |
| 5,275,647 | 1/1994 | Winnik | . |
| 5,462,592 | 10/1995 | Murakami et al. | 106/31.27 |
| 5,509,957 | 4/1996 | Toan et al. | 106/31.43 |
| 5,725,641 | 3/1998 | MacLeod et al. | 106/31.5 |

FOREIGN PATENT DOCUMENTS

| | | |
|---|---|---|
| 490195 | 6/1992 | European Pat. Off. . |
| 544301 | 6/1993 | European Pat. Off. . |
| 559310 | 9/1993 | European Pat. Off. . |
| 583133 | 2/1994 | European Pat. Off. . |
| 09241558 | 9/1977 | Japan . |
| 03122171 | 5/1991 | Japan . |
| 03192156 | 8/1991 | Japan . |
| 04065277 | 3/1992 | Japan . |
| 04065278 | 3/1992 | Japan . |
| 04065279 | 3/1992 | Japan . |
| 04091988 | 3/1992 | Japan . |
| 05169854 | 7/1993 | Japan . |
| 05345872 | 12/1993 | Japan . |
| 07133452 | 5/1995 | Japan . |
| 07164729 | 6/1995 | Japan . |
| 09059552 | 3/1997 | Japan . |
| 09217033 | 8/1997 | Japan . |
| 09241553 | 9/1997 | Japan . |
| 09272832 | 10/1997 | Japan . |
| 09324146 | 12/1997 | Japan . |
| 10017802 | 1/1998 | Japan . |
| 10036728 | 2/1998 | Japan . |
| 2305929 | 4/1997 | United Kingdom . |

Primary Examiner—Mark L. Bell
Assistant Examiner—Veronica Faison
Attorney, Agent, or Firm—Michael D. Jones; Raymond A. Jenski

[57] ABSTRACT

This invention concerns a composition for use as an additive in an ink composition for an inkjet printer or a laserjet printer or as a coating on paper or plastic substrate used in an inkjet or laserjet printer which improves lightfastness and durability properties of the ink, which additive composition comprises: (A) at least one ultraviolet absorber, (B) at least one free radical inhibitor, (C) at least one antioxidant, and (D) at least one liquid carrier selected from the group consisting of water, organic liquid or combinations thereof. These compositions result in a print image that is more colorfast and durable than those of the conventional art.

12 Claims, 3 Drawing Sheets

MEDIA
(IJ Transparency, Photo Paper, Etc.)

ADDITIVE COATING

SPECTRA MEASUREMENT

LIGHT

INK JET PRINTING

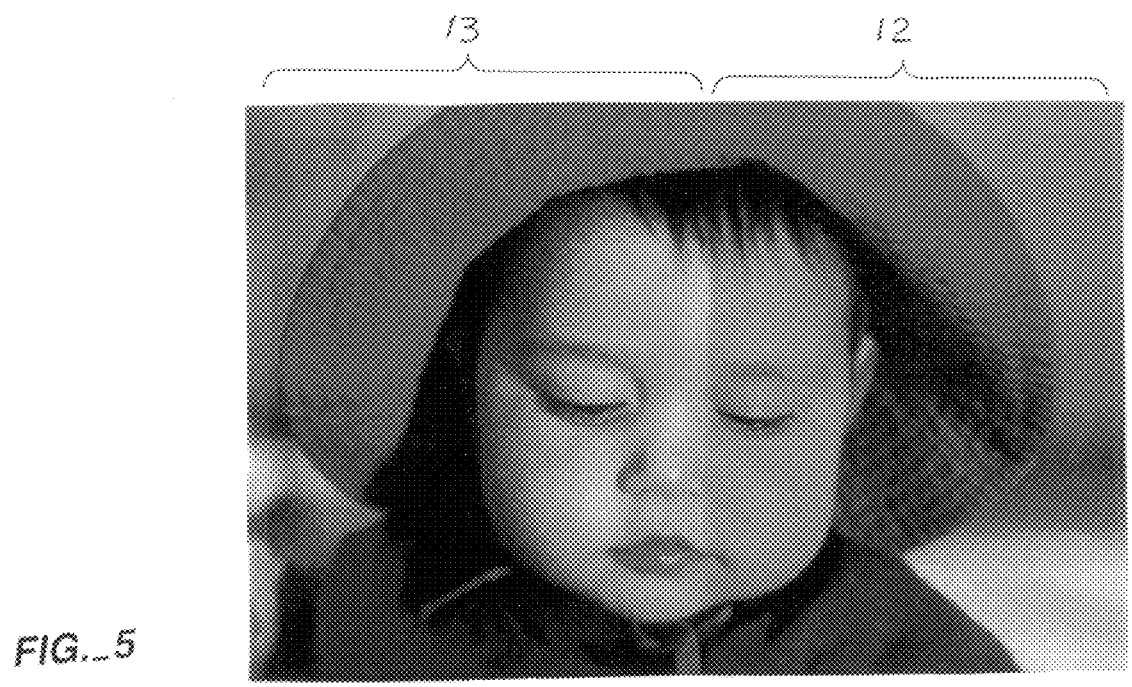
FIG._5

COMPOSITION TO IMPROVE COLORFASTNESS OF A PRINTED IMAGE

BACKGROUND OF THE INVENTION

1. Field of the Invention

The present invention concerns a composition of additives in small concentration in an ink used for inkjet printing. In one aspect the composition of a UV-absorber, a free radical inhibitor and an antioxidant are added to a liquid ink composition. Upon spaying the ink into the paper, the ink shows improved colorfastness and durability. In another aspect the composition is coated on the printing medium (e.g. paper, plastic) to react with ink when the ink from the printer contacts the medium. The sprayed ink shows improved colorfastness and durability.

2. Description of Related Art

Ink additive—The use of inkjet printing systems has grown dramatically in recent years. This growth is attributed to substantial improvements in print resolution and overall print quality, coupled with appreciable reduction in cost. Today's inkjet printers offer acceptable print quality for many industrial, commercial, business, and residential applications at competitive time and cost. Intensive research and development efforts continue toward improving light fastness of inkjet images. In general light fastness of inkjet images still falls short of that produced by other technologies such as electrophotography or gravure printing. A continued demand in inkjet printing has resulted in the need to develop reliable printers capable of producing high quality colorfast (lightfast) and durable images at a reasonable cost.

An inkjet image is formed when a precise pattern of dots is ejected from a drop generating device known as a "printhead" onto a printing medium. The typical inkjet printhead has an array of precisely formed nozzles located on a nozzle plate and attached to an inkjet printhead substrate. The substrate incorporates an array of firing chambers that receive liquid ink (colorants, pigments and/or dyes dissolved or dispersed in a solvent) through fluid communication with one or more ink reservoirs. Each chamber has a thin-film resistor, known as a "firing resistor" located opposite the nozzle so ink can collect between the firing resistor and the nozzle. In particular, each resistor element, which is typically a pad of a resistive material measures about 35 $\mu$m×35 $\mu$m. The printhead is held and protected by an outer packaging referred to as a print cartridge, i.e., inkjet pen.

Upon energizing of a particular resistor element a droplet of ink is expelled through the nozzle toward the print medium, e.g., paper, transparent film, or the like. The firing of ink droplets is typically under the control of a microprocessor, the signals of which are conveyed by electrical traces to the resistor elements, thereby forming alphanumeric and other characters on the print medium.

The fine tolerances of the nozzles, typically 30 to 40 $\mu$m diameter, require that the ink not clog the nozzles. Further, repeated firings of the resistor elements must withstand millions of firings over the life of the ink cartridge to be commercially practical. This also can result in fouling of the resistor elements and degrading pen performance. The build up of residue on the resistor elements is unique to inkjet printers and is known as "kogation" and defined as the build up of residue (kogo) on the resistor surface. The ink composition must be capable of interacting with the print medium, especially paper to penetrate the paper without undue spreading and a subsequent decrease in print quality. Furthermore, in order to maintain the integrity of the printed image over time, it is important that the colorant is lightfast. Inks are known which posses one or more of the foregoing properties.

However, few ink compositions are known that possess all the foregoing desired properties. This is because an improvement in one property often results in the degradation of another property. For example, U.S. Pat. Nos. 4,694,302 and 5,062,892 disclose dyes such as Food Black 2 and ICI (now Zeneca) 286/287 for use in black inkjet inks. Although these inks have been useful in the past, they either suffer from extremely poor color (or light) fastness or slight light fastness improvements at the expense of inkjet pen (print cartridge) performance.

Thus, many inks now commercially used represent a compromise in an attempt to achieve an ink evidencing at least an adequate response in each of the performance attributes such as light fastness and pen performance. None of these ink offer both outstanding light fastness and acceptable pen performance.

Accordingly, research continues into developing ink formulations which have improved properties and which do not improve one property at the expense of the others. Thus, the challenge remains to further improve the colorfastness (or lightfastness) of the inkjet print without sacrificing pen performance and reliability.

Additional Coating on Substrate—The demand for color ink and black ink printers is increasing. The inkjet printer having a non-impact recording system is preferred. This is because of its capabilities in rapid color recording for its system. However, there are still many problems for obtaining and maintaining acceptable multicolor images in high speed recording.

From the standpoint of using a speciality substrate e.g., or paper or plastic, these papers must have colorfastness, sufficient ink-absorbency and dryability. In order to solve the problems of superposing the plural ink droplets and of increasing the number of ink droplets per unit area, it is required that the ink-absorptive capacity is excellent. Owing to the high speed recording rapid drying of the ink after the fixing is necessary. Meanwhile, inkjet recording papers are mainly divided into two groups. One is the plain type ink jet recording paper, which consists of cellulosic fibers or of cellulosic fibers and a filler in order that inks may be absorbed in the space between fibers or spaces which are formed fiber and filler. The other paper is the coated type inkjet recording paper, which consists of paper, a substrate and coating materials, which consists of pigment and binder, in order that inks may be absorbed in a fine void of the coating layer. Although the coated type recording paper provides a small spread and a circular form of ink dot, as well as a high resolution ink absorption rate. Hence the paper has the drawback that it is unsuitable for the multicolor printing using a large amount of ink and is too expensive.

Recently, the demand of plain type papers excellent in the economics, paper-like figures and feeling has increased with high speed printing.

Some art of interest are these areas include:

C. A. MacLeod in U.S. Pat. No. 5,725,641 discloses speciality lightfast inks for inkjet printing.

M. Sakaki et al. in U.S. Pat. No. 5,266,383 disclose a recording medium inkjet recording method.

Y. Kojima et al. in U.S. Pat. No. 5,180,624 disclose a multilayer inkjet recording paper.

M. Sakaki et al. in U.S. Pat. No. 5,266,383 disclose a recording medium inkjet recording method.

K. Yasuda et al. in U.S. Pat. No. 5,213,873 disclose an aqueous inkjet recording sheet capable of recording clear brilliant color images having high durability and resistance to curling and undulations.

F. M. Winnik, U.S. Pat. No. 5,275,647 discloses inkjet compositions containing dye-colored micelles.

B. L. Bradley et al., U.S. Pat. No. 5,254,160 discloses magenta dye inkjet and color set.

H. Morimoto et al., Japanese Kokoi Patent JP 09217033 A2, (Aug. 19, 1997).

C. M. Hesler et al., UK Patent Application GB 2305929 A1, (Apr. 12, 1997).

A. Onodera, et al., Japanese Kokoi Patent JP 09059552 A2, (Mar. 4, 1997).

T. Ooi et al., Japanese Kokoi Patent JP 07164729 A2, (Jun. 27, 1995).

A. Onodera, et al., Japanese Kokoi Patent JP 10036728 A2, (Feb. 10, 1998).

S. Hazana et al., Japanese Kokoi Patent JP 10017802 A2, (Jan. 20, 1998).

D. Ishibashi et al., Japanese Kokoi Patent JP 09324146 A2, (Dec. 16, 1997).

S. Nishihara et al., Japanese Kokoi Patent JP 09272832 A2, (Oct. 21, 1997).

A. Onodera et al., Japanese Kokoi Patent JP 09241558 A2, (Sep. 16, 1977).

H. Ninomya et al., Japanese Kokoi Patent JP 09241553 A2, (Sep. 16, 1997).

T. Shimomura et al., Japanese Kokoi Patent JP 07133452 A2, (May 23, 1995).

S. Koike et al., European Patent Application 583133 A1, (Feb. 16, 1994).

K. Sherota, et al., Japanese Kokoi Patent JP 05345872 A2, (Feb. 27, 1993).

P. Gregory et al., European Patent EP 559310 A1, (Sep. 8, 1993).

J. Murata et al., Japanese Kokoi Patent JP 05169854 A2, (Jul. 9, 1993).

T. Abe et al., European Patent EP 544301 A1, (Jun. 2, 1993).

T. Eida et al., European Patent EP 490195, (Jun. 17, 1992).

N. Nakayama et al., Japanese Kokoi Patent 04091988 A2, (Mar. 25, 1992).

H. Nakano, Japanese Kokoi Patents JP 04065279 A2, (Mar. 2, 1992), JP 04065278 A2, (Mar. 2, 1992), and JP 04065277 A2, (Mar. 2, 1992).

H. Kawashita et al., Japanese Kokoi Patent JP 03122171 A2, (May 24, 1991).

Y. Tomii et al., Japanese Kokoi Patent JP 03192156 A2, (Aug. 22, 1991).

None of these references, individually or collectively, teach or suggest the present invention.

All articles, patents, patent applications, references, standards, and the like cited herein are hereby incorporated by reference in their entirely.

It is apparent from the above description that an ink composition having improved colorfastness and durability is still needed. The present invention provides a composition to achieve such improved printed image qualities.

SUMMARY OF THE INVENTION

The present invention concerns a composition for use as an additive in an ink composition for an inkjet printer or a laserjet printer or as a coating on paper or plastic substrate used in an inkjet or laserjet printer which improves colorfastness and durability properties of the image, which additive composition comprises:

(A) at least one ultraviolet absorber, (B) at least one free radical inhibitor, (C) at least one antioxidant, and (D) at least one liquid carrier selected from the group consisting of water, organic liquid or combinations thereof.

In another aspect the present invention concern a composition for use as a coating of paper or polymer used in an inkjet printer or a laserjet printer, which composition comprises:

(a) at least one ultraviolet absorber, (b) at least one free radical inhibitor (c) at least one antioxidant, (d) optionally at least one liquid carrier selected from the group consisting of water, organic liquid or combinations thereof, and (e) at least one polymeric binder In another aspect, the present invention concerns a composition of ingredients to be added to an ink composition for use as an ink (or with an ink) in an inkjet printer or a laserjet printer, which composition comprises:

(a) at least one ultraviolet absorber, (b) at least one free radical inhibitor (c) at least one antioxidant, and (d) optionally at least one liquid carrier selected from the group consisting of water organic liquid or combinations thereof.

BRIEF DESCRIPTION OF THE DRAWINGS

FIG. 5 is a color copy of a child's portrait having specific areas coated with the composition of the present invention and other areas remaining uncoated. Upon exposure to light the coated portions have superior colorfastness.

DETAILED DESCRIPTION OF THE INVENTION AND PREFERRED EMBODIMENTS

Definitions

Figure 1:
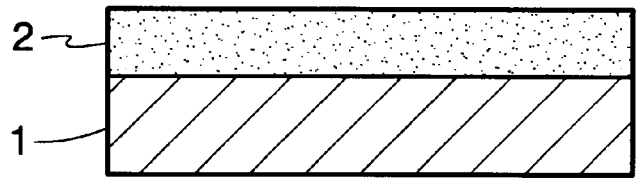
FIG. 1 is a schematic cross-sectional representation of a sheet of paper coated with a composition of the present invention.

Standard definitions and terminology are used as found in accepted chemical and printing dictionaries and encyclopedias, such as *Hawley's Condensed Chemical Dictionary,* 11th ed, published by Van Nostrand Reinhold Company, Inc. of New York, N.Y. in 1987 and the latest published multivolume edition of the *Kirk-Othmer: Encyclopedia of Chemical Technology.*

As used herein:

"Colorfast" or "lightfast" refers to the quality of the printed image. The improved colorfast printed image of the present invention retains its color density and detail (and shows significantly less fading) when exposed to light (e.g., ultraviolet light) as compared to a standard print image. Colorfast and lightfast are often used interchangeably herein.

"Antioxidant" refers to any organic or inorganic compound which is added to the composition to retard or eliminate oxidation and deterioration of the ink or the image.

"Free radical inhibitor" refers to any organic or inorganic compound added to the composition to retard or eliminate any molecular fragment having one or more unpaired electrons, which are usually short-lived and highly reactive.

"Irgaperm" refers to trademarked group of free radical inhibitors which are commercially available.

"Phenol" refers to the conventional hydeoxy benzene.

"Polymer binder" or polymeric binder" refers to any water dispersible or water soluble organic polymer which will function as a coating for paper or a polymer sheet for ink jet printing. Polymers such as polyvinyl alcohol, and poly (vinyl pyrrolidone) are preferred.

"Substituted phenol" refers to structures as shown:

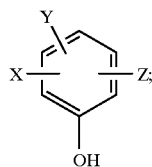

wherein X, Y, and Z are each individually selected from the group consisting of H—, C1 to C4 alkyl, —F, —Cl,—Br, phenyl and combinations thereof with the provision that at least one X, Y, and Z is not hydrogen.

"TRITON" refers to a trademarked group of surfactants available from Rohm and Haas Philadelphia Pa. having a variety of structures including "TINUVIN" refers to a trademarked group of ultraviolet absorbers available from Ciba-Giegy, having a variety of structures including "Ultraviolet absorber" refers to an organic or inorganic substance which absorbs radiant energy in the wavelength of the ultraviolet (UV).

Ink Additive—In one embodiment the present invention is the additive composition of a number of components, e.g., a UV-absorber, a free radical inhibitor, an antioxidant and optionally a liquid carrier selected from the group consisting of water, organic liquid or combinations thereof. The UV-absorber free radical inhibitor and antioxidant are selected from those as described herein. The optional liquid carrier needs to be volatile so that under the conditions of inkjet printing it vaporizes and does not interfere with the printing of the print image obtained.

Two methods are contemplated to use the additive composition. First, the additives can be added to the ink composition as stored in an ink cartridge. These additive components individually or collectively to not react or interfere in a negative way with ink or printing (i.e., thickening, clogging, smearing, etc.). Second, the additive composition can be stored in the a separate container in the inkjet printer. It is connected to the print head in inkjet away so that the additive composition is sprayed on to the sheet to be printed immediately before, during or after the ink is printed (less than 5 sec. and preferably less than 1 sec. before or after printing).

Figure 2:
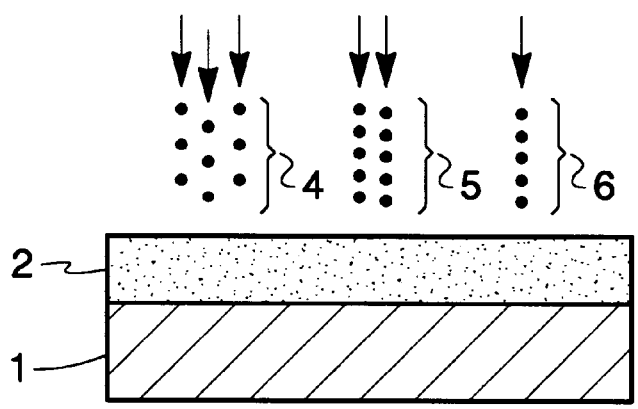
FIG. 2 is a schematic cross-sectional representation of the coated paper of FIG. 1 being subjected to inkjet spray of ink.
Figure 3:
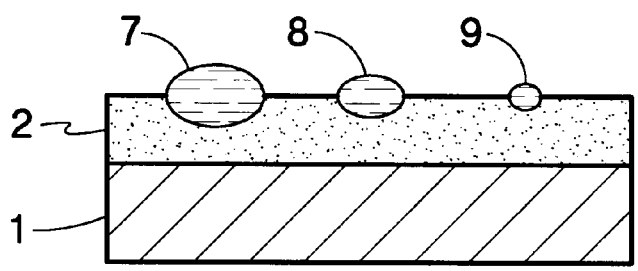
FIG. 3 is a schematic cross-sectional representation of the inkjet spray of ink as it has reacted with the surface coating to produce an improved print.

Coated substrate—Referring to FIGS. 1, 2, 3, and 4 the inkjet printing of a coated substrate according to the present invention is described. FIG. 1 shows the cross sectional view of a paper 1 with a coating 2 of a composition of UV-absorber, free radical inhibitor and antioxidant (Figure not to scale). FIG. 2 shows the paper 1 and coating 2 being contacted with the ink droplet patterns 4, 5, and 6 from an ink jet. The ink droplets 7, 8, and 9 contact the surface coating 2 and absorb and contact the UV-absorber, the free radical inhibitor and the antioxidant. FIG. 3 shows print 7, 8, and 9 which usually does not contact the paper or polymer substrate. However, in some cases the ink printed on the coating may also extend through the coating and be absorbed by the paper or polymer carrier 1. The ink print from this process has improved lightfastness and durability as compared to conventional printing ink compositions.

Figure 4:
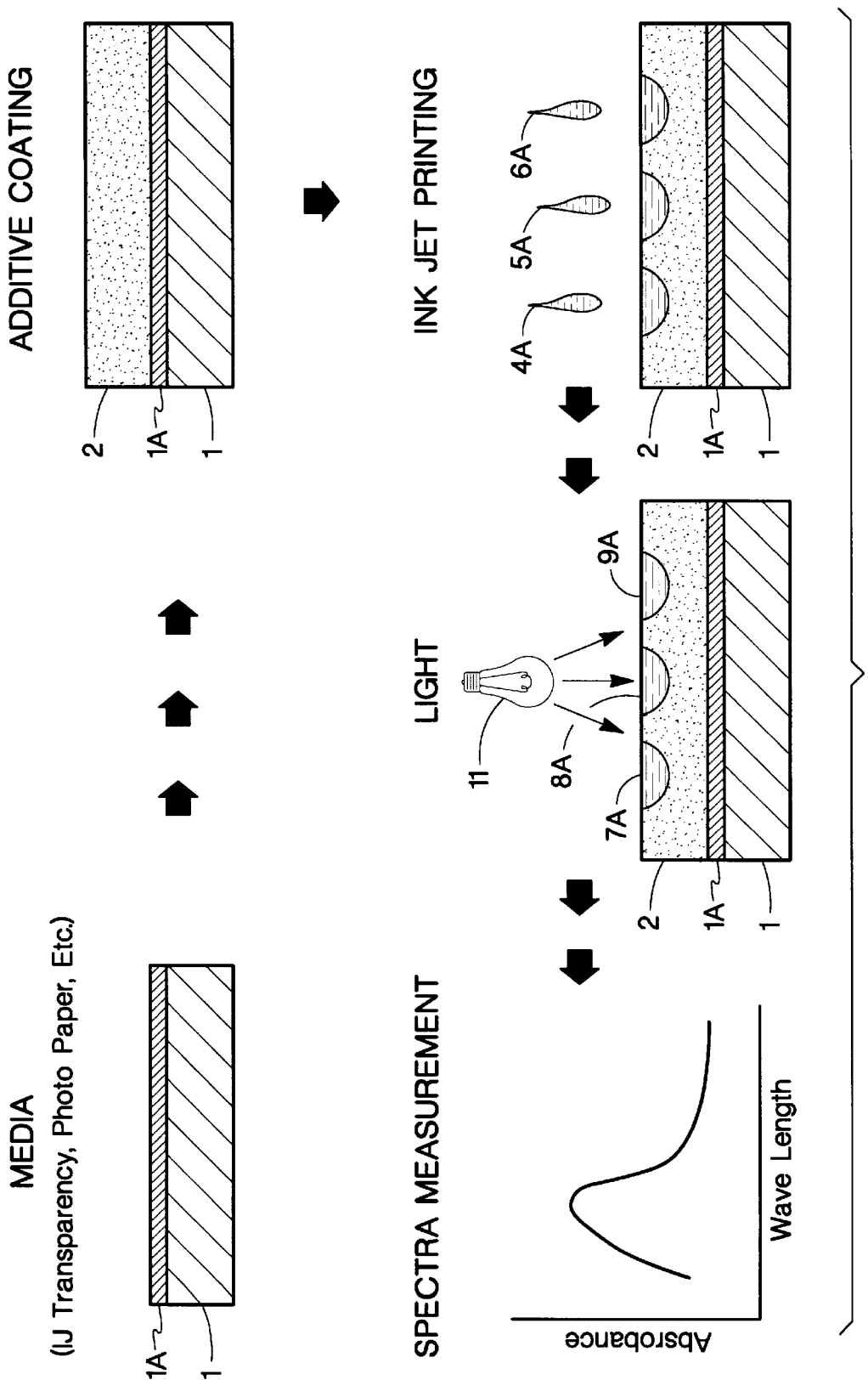
FIG. 4 is a schematic representation of the process of the present invention for inkjet printing of a coated sheet of paper or polymer.

FIG. 4 is a summary of the printing process described hereinabove. In FIG. 4, layer 1A is an optionally coating already on the surface of the paper or polymer substrate. Coating 1A may facilitate the adhesion of coating 2 and/or provide special properties of the final printed image. The ink components 4A, 5A, and 6A are deposited on the coating 2 as print 7A, 8A, and 9A. In FIG. 4 light, e.g., ultraviolet light 11 contacts the printed image. This light contact induces color changes and fading in the areas which do not have the coating of the present invention. The special measurement graph of absorbance versus wavelength show shown in the left lower corner makes it possible to measure with some Component 1

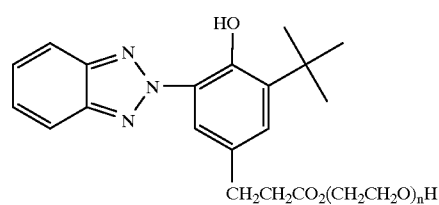 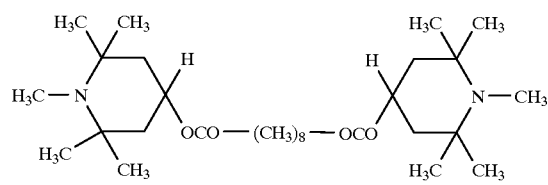

Component 2

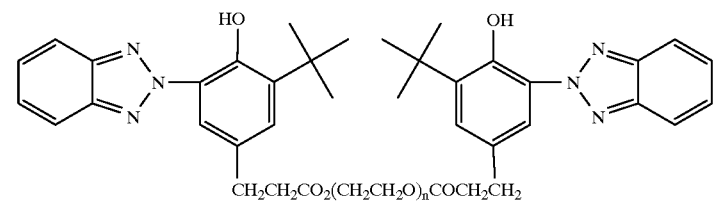

accuracy the colorfast qualities. When the ink and additive coating are placed on a polymeric sheet (e.g., HP TRANSPARENCY). The printed coated sheet can be measured for absorbence. After subjecting the image to light (e.g., UV light) absorbence the present polymer sheet is measured again. The difference in absorbence is the amount of fading and loss of colorfastness is determined. If the coating and ink placed on the paper sheet. Then the reflections of the print is measured again to determine the decrease in colorfastness.

FIG. 5 is a sheet showing result of the improved present invention. The inkjet is PHOTOSMART™, a trademarked ink from Hewlett-Packard Company, Palo Alto, Calif. The paper is commercially available Hewlett-Packard PHOTOSMART™ glossy photo-paper. The additive composition 1225 TINUNIN 292 (1 wt. %), the UV-absorber is TINUVIN 1130 (2%), the antioxidant is IRGRAPERM 2140 (2 wt. %), from and the binder is water soluble PVP K90 (a poly (vinyl pyrrolidone) (5 wt. %) from the commercial source. The coating in between about 10 and 10,000 micron thick and drys quickly under ambient conditions. The color print is then subjected to ultraviolet light for 240 hrs. All components are dissolved in isopropyl (90 wt. %). the The region of the color print of the little girl coated with the additives described shows significantly greater color density and definition as compared to the region of the print (FIG. 5) which was not coated with the additive.

Table 1 below shows some typical additive categories and structures:

invention provides ways of obtaining the best chemical classes for the ink system. The chemical classes comprise a UV-absorber, free radical inhibitor and thermal stabilizer (antioxidant) and/or their combinations.

One novel aspect of this invention is the use of the principle of energy dissipation to reduce chemical bond breaking, and free radical inhibitor to prevent further chemical reaction. This invention is the first to combine additives to dissipate energy and to prevent free radical chemical reactions. A UV-absorber is used to dissipate energy of molecules at excited states. The chemical classes of UV-absorbers include chemicals that can form hydrogen bond six-member ring of enol-keto tautomer. The hydrogen (porton) transfer rate at the excited state has to be faster than bond breaking rate of the dye molecule. The chemical classes of free radical inhibitors include hindered amines. These additives prevent free-radical chain reactions during the chemical bond breaking process. The chemical classes of thermal stabilizers or antioxidant in general include the phenol, phosphite, etc. chemical families. They are oxidized to reduce dye oxidation.

Another important part of this invention is to control ink spreading on the substrate. This control improves colorants and additives interactions to improve lightfastness. Most previous advances try to improve dry time and water resistance instead of lightfastness alone. Some patents claim to have improved lightfastness, but most of them were attributed to filler, such as silicate, aluminum oxide etc. The major difference of this invention is to prevent and stop chemical Additive types and structure

| Additives | Fundamental structure |
|---|---|
| Energy dissipation<br>-UV absorber: Tinuvin 1130 | [benzotriazole structure with phenol, CH₂CH₂CO₂—] |
| Free radical inhibitor<br>-hindred amines: Tinuvin 292 | [hindered piperidine structure with OCO(CH₂)₂—] |
| Antioxidants: reducing agent or<br>Irgaperm 2140 etc | [substituted phenol structure], $H_2PO_2$ |

While not wanting to be bound by theory, this invention provides a method and composition for improving lightfastness of images. The basic principle to improve lightfastness is to use chemical additives to interact with colorant molecules or polymers to prevent chemical bonds from breaking in colorant molecules or polymers. In this fashion, the reactions of the colorant. The basic principle to prevent fading is by dissipating energy and also stopping free radical chain reactions and oxidation. This approach is the major difference from others that may use a UV-absorber or antioxidant. The UV-absorber only dissipates energy but can not prevent chemical reaction. In the photo-process, photophysics and photochemistry are both involved. The previous research only solves part of the problem. The current invention combines three chemical families which work together to inhibit reaction. The UV-absorber dissipates energy, free radical inhibitor stops chain reactions and the antioxidant stops oxidation. With these three components present, dramatic improvement of the lightfastness of images is obtained.

The advantages of the present invention include but are not limited to:

The protection of color image of inkjet prints.

Increased image lightfastness.

The protection of binders (resins, polymers) to prevent the image from detaching from the substrate.

The replacement of expensive dye material (pigments) with lower cost dye materials with the same lightfastness.

All recited additives are commercially available.

The additives, not only protect color images, can also improve the properties of polymers in the substrate or binders.

The ease of application, no pigment particles to grind and pigment particles size control is unnecessary.

The following examples are presented for the purpose of illustration and description only. They are not to be constructed to be limiting in any way.

GENERAL Chemicals, additives, polymers and solvents are available from chemical supply houser such as Aldrich Chemical Co., Milwaukee, Wis.

EXAMPLE 1

Formulation 2215

Chemicals: UV-absorber, TINUVIN 171 and TINUVIN 1130; free radical inhibitor, TINUVIN 292 and TINUVIN 144; and antioxidant, IRGANOX 1010 and IRGAPERM 2140. All of these are from Ciba-Giegy Corporation, 540 White Plains Rd., P.O. Box 2005, Tarrytown, N.Y. These additives (most of them are water dispensable) were dissolved in isopropyl alcohol with poly (vinyl pyrrolidone-PVP) K-90 polymer available from International Speciality Products, Wayne, N.J. as binder.

Example 2215 formula: 2% IRGAPERM 2140, 2% TINUVIN 1130, 1% TINUVIN 292 and 5% PVP K-90 with the remainder being isopropyl alcohol (90%) solution (wt/%). (Note the percentages create the number of the formulation.)

This coated surface a polymeric film showed dramatic improvement in lightfastness. A summary of the test results is in the Table below:

TABLE 2

$\Delta E$ of 288 Hours of Colorfastness Test [1,2]

| Color/Formula | 2215f | 2215fc |
|---|---|---|
| Cyan | 41.7 | 11.5 |
| Magenta | 31.7 | 2.5 |
| Yellow | 24.7 | 3.0 |
| Background | 6.6 | 5.1 |
| Black | 41.0 | 20.1 |
| Green | 54.6 | 26.9 |
| Red | 13.8 | 15.0 |
| Blue | 47.9 | 30.1 |

[1] For the coatings: the number represents the additive formula; f means transparency; c means coated
[2] The $\Delta$ Es were calculated from the change in color after the samples were exposed to light. The smaller the $\Delta$ E, the less the color change.

From the table, the additives improved color lightfastness dramatically. The improvement in lightfastness of the colored print is estimated to be between about 2 and 20 times.

EXAMPLE 2

Formulation 1225

The components of Formulation 1225 are:
1% Igraperm 2140, 2% Tinuvin 1130, 2% Tinuvin 292, 0.5–1% Triton X-114 (trademark of Rohm & Haas Co.), and 5% polyvinyl alcohol in isoproponol.

The PVA solution is prepared and prepared PVA (or other aqueous polymer solution). Triton X-114 is added. Igraperm 2140 IPA solution (10%) is and into a high shear mixing solution. Tinuvin 1130 (liquid form) and is added and then Tinuvin 292 (liquid form) is added into above solution with high speed mixing. The mixing time depends on the solution, it may require 30 mins.

A paper sheet is prepared and this coating is added as then layer between about 0.5 and 10, mil, preferably about 2 mil. The coating is dried and printed with ink.

Upon contact with ultraviolet light, the additive coating provides improved colorfastness to the black and colored ink.

EXAMPLE 3

Formulation 2225

Formulation 2225: 2% sodium hypophosphite, 2225 2% Tinuvin 1130, 2% Tinuvin 292, 0.5–1% Triton X-114, and 5% polyvinyl alcohol. The remainder is isopropyl alchol. Dispersion process:

PVA (or other polymer aqueous solution) is prepared.

Adequate sodium hypophosphite aqueous solution with mixing.

Triton X-114 (trademark of Rohm & Haas Co. is added into this solution.

Tinuvin 1130 (liquid form) and then Tinuvin 292 (liquid form) is added into the solution with high speed mixing.

The mixing time depends on the solution, it may require 30 minutes.

The difference between Formula 1225 and 2225 is only the antioxidant-IGRAPERM 2140 was replaced by sodium hypophosphite. 2225 has slightly better dispersion than Formula 1225 by subjective judgements. The test result of 2225 is still in early stage. Nevertheless, it showed good fading protection in the cyan ink of DJ 550 ink. The Yellowstone ink tests are positive.

EXAMPLE 4

Formulation 2215 Formulation 1111 and Formulation 0111

The formulations were combined as described in Example 1. Upon treatment with UV-light for 288 hrs. The results of colorfastness are found in Table 3 and the discussion which follows:

TABLE 3

$\Delta E$ of 288 Hours of Lightfastness Test

| Color/Formula | 2215s | 2215sc | 1111s | 1111sc | 0111s | 0111sc |
|---|---|---|---|---|---|---|
| Cyan | 13.2 | 38.3 | 12.9 | 21.7 | 12.7 | 23.9 |
| Magenta | 13.1 | 5.5 | 12.5 | 10.9 | 11.9 | 9.3 |
| Yellow | 58.9 | 2.0 | 58.5 | 4.3 | 55.9 | 4.8 |
| Background | 1.6 | 2.9 | 1.5 | 2.9 | 1.6 | 2.2 |

TABLE 3-continued

ΔE of 288 Hours of Lightfastness Test

| Color/Formula | 2215s | 2215sc | 1111s | 1111sc | 0111s | 0111sc |
|---|---|---|---|---|---|---|
| Black | 11.0 | 5.4 | 10.0 | 7.0 | 10.2 | 9.1 |
| Green | 13.4 | 8.3 | 12.0 | 10.5 | 12.6 | 5.9 |
| Red | 28.8 | 7.6 | 27.2 | 3.3 | 26.7 | 4.5 |
| Blue | 16.0 | 4.4 | 16.1 | 14.1 | 14.5 | 10.2 |

Column 2215s is the standard uncoated Sheraton paper sheet.
Column 2215sc is the coated paper sheet printed with the listed colors. As can be seen the coated colors are smaller and therefore more colorfast.
Column 1111s is a standard uncoated Sheraton paper sheet.
Column 1111sc is the coated paper sheet printed with the listed colors. As can be seen the coated colors have a smaller number and therefore are more colorfast.
Column 0111s is a standard uncoated Sheraton paper sheet.
Column 0111sc is the coated sheet printed with the listed colors. As can be seen the coated colors have a smaller number and are therefore more colorfast.

Column 2215s is the standard uncoated Sheraton paper sheet.

Column 2215sc is the coated paper sheet printed with the listed colors. As can be seen the coated colors are smaller and therefore more colorfast.

Column 1111s is a standard uncoated Sheraton paper sheet.

Column 1111sc is the coated paper sheet printed with the listed colors. As can be seen the coated colors have a smaller number and therefore are more colorfast.

Column 0111s is a standard uncoated Sheraton paper sheet.

Column 0111sc is the coated sheet printed with the listed colors. As can be seen the coated colors have a smaller number and are therefore more colorfast.

EXAMPLE 5

Hewlett-Packard Desk Jet DJ 870 Printer

The coating was prepared according to Example 1 and coated on a Sheraton paper sheet. Additives improved colorfastness with Monet Inks and PHOTOSMART Inks. Some comparisons shown in Table 4.

TABLE 4

| Color/Name | A DJ870 | C DJ870 | B DJ870 | D DJ870 |
|---|---|---|---|---|
| Yellow blank | 6.94 | 8.11 | 7.55 | 6.68 |
| Yellow coated | 7.00 | 4.31 | 6.52 | 17.67 |
| Cyan blank | 6.75 | 8.08 | 9.50 | 8.35 |
| Cyan coated | 7.46 | 3.58 | 9.34 | 17.39 |
| Magenta blank | 17.63 | 19.84 | 17.73 | 17.62 |
| Magenta coated | 10.52 | 8.36 | 16.97 | 39.09 |
| Black blank | 0.65 | 0.74 | 1.01 | 0.94 |
| Black coated | 1.95 | 1.73 | 3.02 | 2.10 |
| Background | 0.24 | 0.56 | 6.33 | 0.83 |
| Background coated | 0.54 | 1.28 | 7.33 | 1.84 |

EXAMPLE 6

Hewlett-Packard Photosmart Printer

The coating was prepared according to Example 1 and coated in a Sheraton paper sheet. Some comparisons are shown in Table 5.

Additive improved the colorfastness of the Monet Inks and PHOTOSMART Inks.

TABLE 5

| Color/Name | A photo | C photo | B1 photo | B2 photo | D photo |
|---|---|---|---|---|---|
| Yellow blank | 13.46 | 13.63 | 15.30 | 16.10 | 17.20 |
| Yellow coated | 5.73 | 1.48 | 4.69 | 2.80 | 20.28 |
| Cyan blank | 6.78 | 5.87 | 7.36 | 4.56 | 7.88 |
| Cyan coated | 9.17 | 3.01 | 8.36 | 5.71 | 19.64 |
| Magenta blank | 23.10 | 22.83 | 27.03 | 19.94 | 28.12 |
| Magenta coated | 8.19 | 2.63 | 3.87 | 4.15 | 30.30 |
| Black blank | 9.24 | 8.91 | 10.13 | 8.24 | 10.37 |
| Black coated | 3.55 | 3.45 | 2.44 | 1.66 | 12.19 |
| Background | 5.19 | 4.23 | 6.69 | 3.45 | 5.80 |
| Background coated | 9.39 | 4.47 | 7.91 | 4.31 | 13.51 |

The smaller the number of the coated color as compared to the blank (stamped) the more the improvement in colorfastness.

While only a few embodiments of the invention have been shown and described herein, it will become apparent to those skilled in the art that various modifications and changes can be made in the composition of additives for an ink or for the composition of a coating on a paper to produce printing which is colorfast and durable without departing from the spirit and scope of the present invention. All such modifications and changes coming within the scope of the appended claims are intended to be carried out thereby.

We claim:

1. A composition for use as an additive in an ink composition for an inkjet printer or a laserjet printer or as a coating on paper or plastic substrate used in an inkjet or laserjet printer which improves light fastness and durability properties of the printed image, which additive composition comprises:

(A) at least one ultraviolet absorber selected from the group consisting of benzotrizole, benzophenone, and acetophenone, (B) at least one free radical inhibitor selected from the group consisting of hindered amine, triethyl amine, and tributyl amine, (C) at least one antioxidant selected from the group consisting of phenol substituted phenol, sodium phosphite, and combinations thereof, and (D) optionally at least one liquid carrier selected from the group consisting of water, organic liquid or combinations thereof.

2. The composition of claim 1 for use as an additive to ink used in an inkjet printer.

3. The composition of claim 1 for use as a coating on paper or plastic substrate used in an inkjet printer or a laserjet printer.

4. The additive composition of claim 1 wherein at least one ultraviolet absorber is present in between about 0.5 and 50.0 percent by weight, at least one free radical inhibitor is present in between about 0.5 and 25.0 percent by weight, at least one antioxidant is present in between about 0.5 and 25.0 percent by weight, and at least one liquid carrier selected from water, organic solvent or combinations thereof is present in between about 1 and 99 percent by weight of the total additive composition.

5. The additive composition of claim 1 wherein in part (D) water is present.

6. The additive of claim 1 wherein the organic liquid in part (D) is selected from the group consisting of glycol ether, alkyl alcohol, polyalkylene glycol, pyrrolidone, and combinations thereof.

7. The additive composition of claim 1 wherein in part (D) the carrier is selected from the group consisting of water, glycol methyl ether, glycolethyl ether, methanol, ethanol, n-propanol, iso-propanol, ethylene glycol, propylene glycol, polyethylene glycol, polypropylene glycol, polyvinyl alcohol, pyrrolidone, and combinations thereof.

8. The additive composition of claim 1 wherein:
   in part (A) the ultraviolet absorber is present in between about 0.5 and 50 percent by weight;
   in part (B), the free radical inhibitor in present in between about 0.5 and 25 percent by weight;
   in part (C), the antioxidant is present in between about 0.5 and 25 percent by weight; and
   in part (D) the liquid carrier is present in between about 1 and 99 percent by weight of the total additive composition.

9. An improved ink composition for an inkjet or a laserjet printer, which composition comprises:
   (A) at least one pigment or at least one dye is present in between about 0.5 and 20 percent by weight,
   (B) at least one ultraviolet absorber selected from the group consisting of benzotrizole, benzophenone, and acetophenone is present in between about 0.5 and 20 percent by weight,
   (C) at least one free radical inhibitor selected from the group consisting of hindered amine, triethyl amine, and tributyl amine is present in between about 0.5 and 25 percent by weight,
   (D) at least one antioxidant selected from the group consisting of phenol substituted phenol, sodium phosphite, and combinations thereof is present in between about 0.5 and 25 percent by weight,
   (E) at least one polymer present in between about 0 and 90 percent by weight, and
   (F) optionally at least one liquid carrier is selected from the group consisting of water, organic liquid or combinations thereof, which liquid carrier is present in between about 0 and 90 percent by weight of the ink composition, wherein the print produced by said improved ink composition exhibits improved colorfastness and durability compared to the print of the art.

10. A composition for coating a substrate for use with an inkjet or a laserjet printer, which composition comprises:
    (A) at least one ultraviolet absorber selected from the group consisting of benzotrizole, benzophenone, and acetophenone is present in between about 0.5 and 50 percent by weight
    (B) at least one free radical inhibitor selected from the group consisting of hindered amine, triethyl amine, and tributyl amine present in between about 0.5 and 25 percent by weight,
    (C) at least one antioxidant selected from the group consisting of phenol substituted phenol, sodium phosphite, and combinations thereof is present in between about 0.5 and 25 percent by weight,
    (D) at least one polymer binder is present in between about 0.5 and 30 percent by weight, and
    (E) at least one liquid carrier is selected from the group consisting of water, organic liquid or combinations thereof, which liquid carrier is present in between about 0.5 and 50 percent by weight of the ink composition.

11. A composition for use as a coating of paper used in an inkjet printer or a laserjet printer, which composition comprises:
    (a) at least one ultraviolet absorber selected from the group consisting of benzotrizole, benzophenone, and acetophenone,
    (b) at least one free radical inhibitor selected from the group consisting of hindered amine, triethyl amine, and tributyl amine,
    (c) at least one antioxidant selected from the group consisting of phenol substituted phenol, sodium phosphite, and combinations thereof, and
    (d) at least one binder, and
    (e) at least one liquid carrier selected from the group consisting of water organic liquid or combinations thereof.

12. A method to produce a printed image having improved colorfastness and durability on a substrate used in an inkjet printer, which method comprises:
    (A) contacting a composition which itself comprises:
        (i) at least one ultraviolet absorber selected from the group consisting of benzotrizole, benzophenone, and acetophenone,
        (ii) at least one free radical inhibitor selected from the group consisting of hindered amine, triethyl amine, and tributyl amine,
        (iii) at least one antioxidant selected from the group consisting of phenol substituted phenol, sodium phosphite, and combinations thereof, and
        (iv) optionally at least one liquid carrier selected from the group consisting of water, organic liquid and combinations thereof, and
        (v) at least one polymetric binder, with a substrate to form a this substantially uniform layer;
    (B) removing the liquid carrier under conditions which create a uniform coating on the substrate;
    (C) subjecting the coated substrate to inkjet printing creating a print image;
    (D) subjecting the print image to light; and
    (E) observing the improved colorfastness and durability of the present image as compared to a conventional print image.

* * * * *